United States Patent [19]
Motose et al.

[11] Patent Number: 5,769,055
[45] Date of Patent: Jun. 23, 1998

[54] ENGINE OVERHEAT CONTROL SYSTEM

[75] Inventors: Hitoshi Motose; Masaki Okazaki, both of Hamamatsu, Japan

[73] Assignee: Sanshin Kogyo Kabushiki Kaisha, Hamamatsu, Japan

[21] Appl. No.: 613,500

[22] Filed: Mar. 11, 1996

[30] Foreign Application Priority Data

Mar. 9, 1995 [JP] Japan .................................. 7-049585

[51] Int. Cl.$^6$ .................................................. F02D 41/22
[52] U.S. Cl. ...................................... 123/478; 123/198 D
[58] Field of Search .................................. 123/478, 480, 123/198 D

[56] References Cited

U.S. PATENT DOCUMENTS

| | | | |
|---|---|---|---|
| 4,389,994 | 6/1983 | Denz et al. | 123/478 |
| 4,572,135 | 2/1986 | Nakajima et al. | 123/478 |
| 5,065,705 | 11/1991 | Fujimoto et al. | 123/41.15 |
| 5,544,639 | 8/1996 | Shouda et al. | 123/676 |

*Primary Examiner*—Andrew M. Dolinar
*Attorney, Agent, or Firm*—Knobbe, Martens, Olson & Bear LLP

[57] ABSTRACT

An overheat protecting system and method for an internal combustion engine wherein a preventive action is initiated if the engine temperature exceeds normal temperature but is still below the danger level. The engine is protected by providing additional cooling such as by supplying additional fuel to the engine. The dangerous condition may also be sensed if the engine temperature increases at more than a predetermined rate for more than a predetermined time or if the engine temperature is more than a predetermined amount for more than a predetermined time interval.

8 Claims, 3 Drawing Sheets

5,769,055

ENGINE OVERHEAT CONTROL SYSTEM

BACKGROUND OF THE INVENTION

This invention relates to an engine overheat control system and more particularly to an improved system for determining when engine overheating is approaching and taking preventive action if possible to avoid engine overheat damage.

A number of arrangements have been provided in order to ensure against damage to an engine caused by overheat conditions. Generally, engines employ temperature sensing devices that output a signal to the operator so that the operator can monitor the engine temperature. For a variety of reasons, however, these indicating systems are not totally effective. It has been proposed, therefore, to provide an additional thermoswitch that is responsive to the engine reaching a dangerous temperature. When the thermoswitch is initiated, the need for protective action can be signaled.

The protective action may constitute the giving of some warning to the operator of the dangerous engine overheat condition. In addition, engine protection may be provided by reducing the speed of the engine. This engine speed reduction permits the operator to still continue to operate the engine to return the associated vehicle to a place where corrective action can be initiated. This so-called "limp home" mode is frequently utilized for this purpose. However, all of the systems as aforedescribed tend to wait to initiate the protective action until after the engine temperature has reached a dangerous level. In addition the engine temperature detector tends to lag behind the actual engine temperature, particularly when the engine temperature is rising.

It is, therefore, a principal object of this invention to provide an engine overheat control system that anticipates when an overheat condition may be occurring.

It is a further object of the invention to provide such an engine overheat control system wherein preventive action is taken to protect the engine before the actual overheat reaches a dangerous situation.

It is a still further object of this invention to provide an improved method and apparatus for sensing when an engine overheat condition may occur and providing protective action before the overheat condition actually exists.

SUMMARY OF THE INVENTION

This invention is adapted to be embodied in an engine overheat control system and method wherein the engine is provided with a cooling system. An engine temperature detector is provided for sensing the temperature of the engine. Overheat prediction means are incorporated which receive the output from the engine temperature detector and anticipate when an overheat condition may result. Engine protection means are provided for taking steps to initiate engine protection in the event the overheat prediction means indicates an overheat condition may be occurring.

DETAILED DESCRIPTION OF THE PREFERRED EMBODIMENTS OF THE INVENTION

Figure 1:
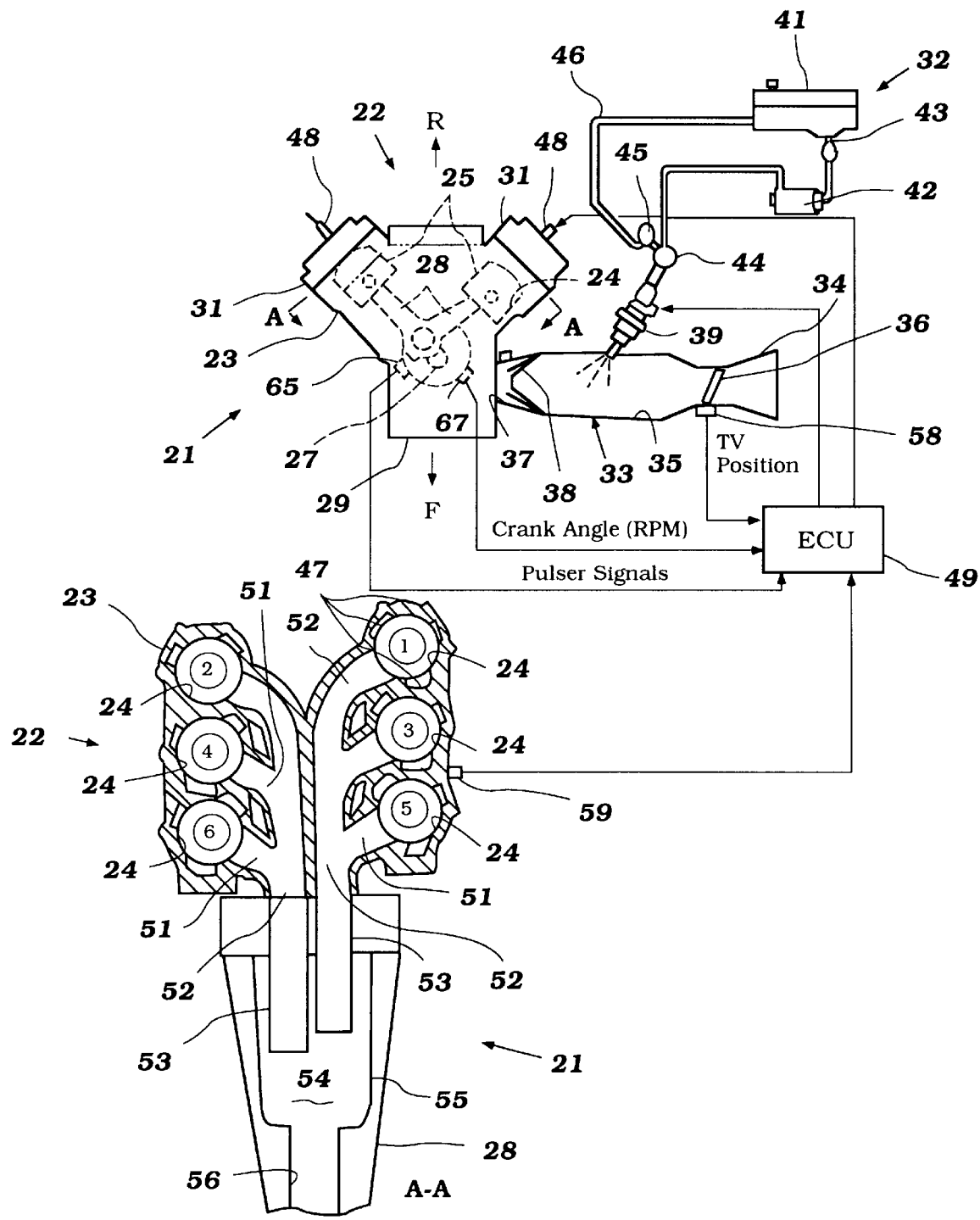
FIG. 1 is a composite view comprised of, at the top, a partially schematic top plan view of the powerhead and associated systems of an outboard motor constructed and operated in accordance with an embodiment of the invention and at the bottom, an enlarged cross-sectional view taken along the line A—A of the upper view.

Referring now in detail to the drawings, and initially to FIG. 1, an outboard motor is show partially and is identified generally by the reference numeral 21. The invention is described in conjunction with an outboard motor, only as a typical environment in which the invention is adapted to be employed. The invention has particular utility in conjunction with engines having cooling systems such as liquid cooling systems, such as are used in reciprocating engines, as shown in this embodiment and identified generally by the reference numeral 22 or, for that matter, rotary engines. In addition, certain facets of the invention have utility with two-cycle engines, which the engine 22 comprises, although the invention is not so limited, as will become readily apparent to those skilled in the art.

Since the invention deals primarily with the construction and operation of the control system for the engine 22, the basic structure of the engine 22 will be described only generally. Where any specific component is not illustrated or described, reference may be had to any conventional construction utilized in the art for the details of such components.

In the illustrated embodiment, the engine 22 is of the V-6 type. For the reasons already noted, it will be apparent to those skilled in the art how the invention has utility and can be practiced in conjunction with engines having other configurations and other cylinder numbers. The engine 22 is, therefore, comprised of a cylinder block 23 which has a pair of angularly related cylinder banks, each of which is formed with three cylinder bores 24. It should be noted that the cylinder bores 24 are numbered as 1, 2, 3, 4, 5 and 6, to facilitate description of the invention.

As is typical with V-type engine practice and as is clearly shown in the lower portion of FIG. 1, the cylinder bores 24 of one cylinder bank and that cylinder bank are staggered relative to the other cylinder bank it its cylinder bores. The reason for this is well known in the art, but will be described subsequently.

Pistons 25 reciprocate in each of the cylinder bores 24. The pistons 25 are connected by means of connecting rods 26 to a crankshaft 27. The offsetting of the cylinder bores 24 permits the connecting rods 26 of the respective cylinder banks to be journaled on common throws of the crankshaft 27, as is also well known in this art.

As is typical with outboard motor practice, the engine 22 is mounted in the associated powerhead of the outboard motor 21 so that the crankshaft 27 rotates about a vertically extending axis. This facilitates coupling of the crankshaft 27 to a driveshaft (not shown), which depends into a driveshaft housing 28 disposed beneath this powerhead. This driveshaft then drives a propulsion unit (not shown) positioned at the lower end of the driveshaft housing 28.

These components of the outboard motor are also not illustrated because they are not necessary to permit those skilled in the art to practice the invention. Again, where any details of the outboard motor 21 are not illustrated or described, they may be considered to be of any type conventionally employed in this art.

The crankshaft 27 is rotatably journaled within a crankcase chamber formed by the skirt of the cylinder block 23 and a crankcase member 29 that is affixed thereto in any known manner. As will be described later and as is well known in the two-cycle engine practice embodying crankcase compression, the principle upon which the engine 22 operates, the crankcase chambers associated with each of the cylinder bores 24 are sealed from each other.

Cylinder head assemblies 31 are affixed to each of the cylinder banks and close the cylinder bores 24. These cylinder heads assemblies 31 have individual recesses which cooperate with the cylinder bores 24 and the heads of the pistons 25 to form the combustion chambers of the engine.

A fuel-air charge is delivered to the individual crankcase chambers of the engine by an induction and charge-forming system, indicated generally by the reference numeral 32. This charge-forming system 32 includes an air induction system and a fuel supply system, which will now be described.

The air induction system includes an air intake manifold, indicated generally by the reference numeral 33, and which includes an atmospheric air inlet device 34 that draws atmospheric air from the atmosphere. In outboard motor practice, this atmospheric air inlet is formed within a surrounding protective cowling, which is not shown in the drawings, that encircles and protects the engine 22. This cowling provides an atmospheric air inlet so that air can be drawn into the protective cowling while water is excluded. This air is then delivered into the manifold air inlet device 34.

The manifold 33 has a plurality of individual runners 35, one for each cylinder of the engine. Throttle valves 36 are mounted in these runners and are controlled by a remotely positioned operator for controlling the speed of the engine 22 in a manner well known in the art.

Each manifold runner 34 discharges into a respective one of the aforenoted sealed crankcase chambers through a respective inlet port 37. A reed-type check valve 38 is provided in each manifold runner 33 adjacent and actually at the intake ports 37 so as to permit the air charge to pass into the crankcase chambers when the respective piston 25 is moving upwardly to increase the volume in the crankcase chamber. These reed-type check valves 38 then close as the pistons 25 move downwardly to compress the charge in the crankcase chambers.

The fuel supply system of the charge-forming system 32 includes a plurality of individual fuel injectors 39. The fuel injectors 39 are of the electric solenoid-operated type and spray into the manifold runners 35.

Fuel is supplied to the fuel injectors 39 from a remotely positioned fuel tank 41. A fuel pump 42 draws the fuel from the fuel tank 41 through a filter 43 and delivers it to a fuel rail 44 that is connected to the injectors 39 for delivery of fuel thereto.

A pressure relief valve 45 is provided in the fuel rail 44 and maintains a uniform pressure therein by dumping fuel back to the fuel supply system through a return conduit 46. In the illustrated embodiment, this returned fuel is returned to the tank 41, but it can be returned any place in the system upstream of the pump 42 or, in fact, downstream of the pump, but upstream of the fuel rail 44.

Thus, a fuel-air charge is formed by the charge-forming system 32 and delivered to the individual crankcase chambers. This charge is compressed in the crankcase chamber, as aforenoted, and then is transferred to the area in the combustion chamber above the pistons 25 through suitable scavenge ports and passages, which appear in FIG. 1 and are identified by the reference numerals 42. The scavenge passages and ports 47 associated with only one of the cylinders have been numbered, but the ports for each cylinder bore 24 clearly are revealed in the lower portion of FIG. 1.

The fuel-air charge which is transferred by the scavenge passages and ports 47 into the combustion chambers is then further compressed as the pistons 25 approach top dead center. At an appropriate time, this charge is ignited by spark plugs 48 mounted in the cylinder head assemblies 31. There is one spark plug 48 supplied for each combustion chamber, although multiple spark plugs per cylinder may be employed in conjunction with the invention. These spark plugs are fired by an ignition system of any known type. The firing of the spark plugs 48 is controlled by a system which includes an ECU 49.

The charge which has been ignited in the combustion chambers will expand and drive the pistons 25 downwardly in their respective cylinder bores 24. Eventually, exhaust ports 51 which are formed integrally in the cylinder block 23 will be opened so as to permit the exhaust gases to flow into a pair of exhaust manifolds 52 which are formed in side-by-side relationship integrally within the cylinder block 23.

As is typical in outboard motor practice, the exhaust manifolds 52 extend downwardly and terminate at a pair of exhaust pipes 53 which depend into the driveshaft housing 28. These exhaust pipes 53 terminate in an expansion chamber 54 formed by an inner shell 55 within the driveshaft housing 28. These exhaust gases are then delivered to the atmosphere through a suitable marine exhaust system, which includes an underwater exhaust gas discharge (not shown) which communicates with a discharge section 56 of the expansion chamber.

As has been noted, certain of the controls for the engine systems are performed by the ECU 49. To perform these controls the ECU receives certain signals indicative of engine running and ambient conditions. These signals include an engine speed signal derived from a crankshaft position sensor 57, a crank angle signal from a crank angle sensor and a throttle angle position signal from a throttle position sensor 58. Ambient conditions may also be used in the engine management control and these conditions may be derived from appropriate sensors, as are well known in this art.

Since the basic control strategy for the engine, except for the over temperature conditions, as will be described, form no part of the invention and may be of any known type, an understanding of the basic control strategy is not necessary to permit those skilled in the art to practice the invention. It will be obvious to those skilled in the art how the invention may be practiced with any known control systems.

The invention relates to over temperature protection and the engine temperature is sensed by an engine temperature sensor 59. The engine 22 is water cooled by water circulated through cooling jackets formed in the cylinder block 23 and cylinder head assemblies in a manner well known in this art. The engine temperature sensor 59 is positioned in proximity to one of these cooling jackets. In the illustrated embodiment this is in the cylinder block cooling jacket.

Figure 2:
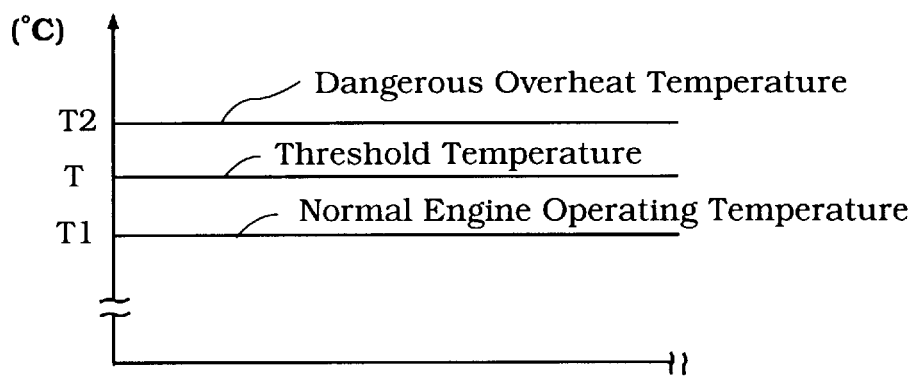
FIG. 2 is a graphical view showing the three different temperature conditions which may occur with an engine in relation to time.

FIG. 2 is a graphical view showing certain engine temperatures and their relationship to the invention. The temperature T1 indicates the normal engine operating temperature. The temperature T2, a higher temperature, is a temperature at which the engine, if continued to operate at full load, may be permanently damaged. The temperature T, which lies between the temperatures, T1 and T2 and may be closer to T1 than to T2, is referred to as a threshold temperature. The threshold temperature is a temperature which if reached by the engine and which may indicate a condition where, if unabated, the temperature T2 will be reached. In accordance with one feature of the invention, if this threshold temperature T is exceeded, then a protective operation will be initiated.

Figure 3:
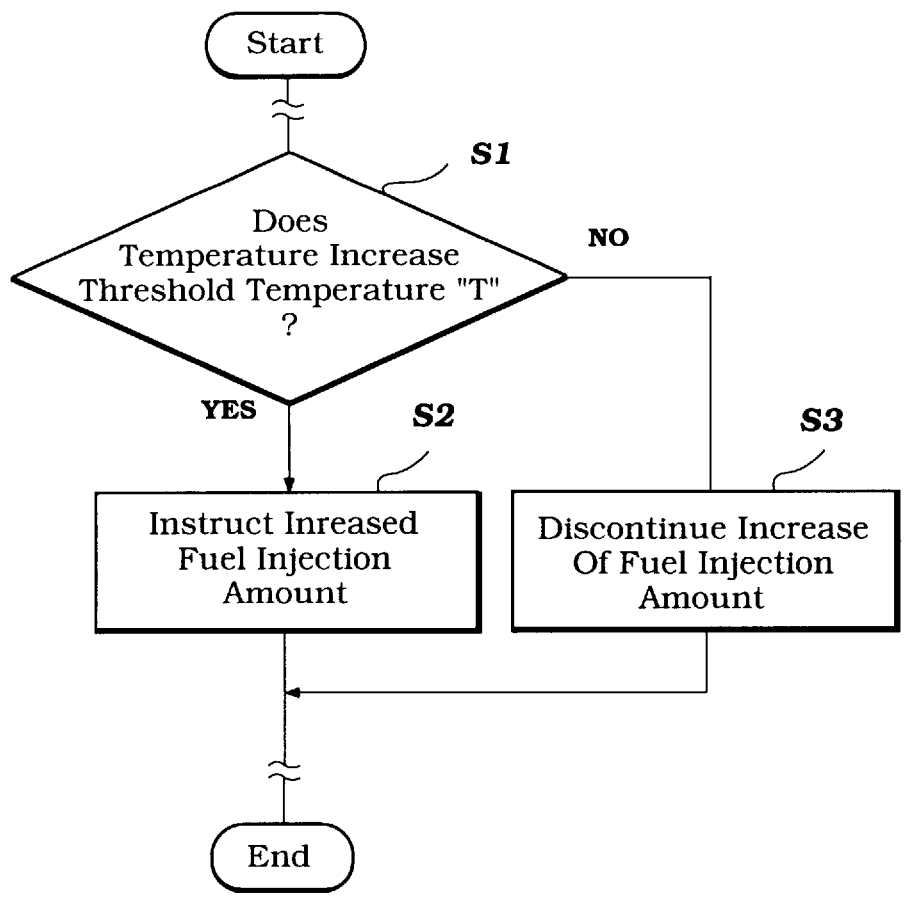
FIG. 3 is a graphical view showing a control routine for ensuring action to protect against damage due to overheating.

Thus, in accordance with the control routine shown in FIG. 3, the program begins and moves to the step S1 to determine if the actual engine temperature exceeds the threshold temperature T. If it does, the program moves to the step S2, so as to instruct an increased amount of fuel injection.

As is generally well known, the engine is operated primarily at a stoichiometric fuel-air ratio. This is a ratio where less than maximum power is developed generally, and also at a ratio that is leaner than that desired to produce maximum horsepower and clearly less than that which would provide cooling protection through the use of additional fuel evaporation in the combustion chamber.

However, if the temperature begins to exceed the threshold temperature T, then the amount of fuel injected is increased at the step S2 to provide engine protection. This additional fuel will produce added vaporization which will tend to reduce the engine temperature through internal cooling. If this is effective in cooling the engine, then at subsequent repeats the program at the step S1 will revert to the step S3 and discontinue the supply of additional fuel. By selecting the temperature T as lower than the dangerous overheat temperature $T_2$, the control will be effective.

Figure 4:
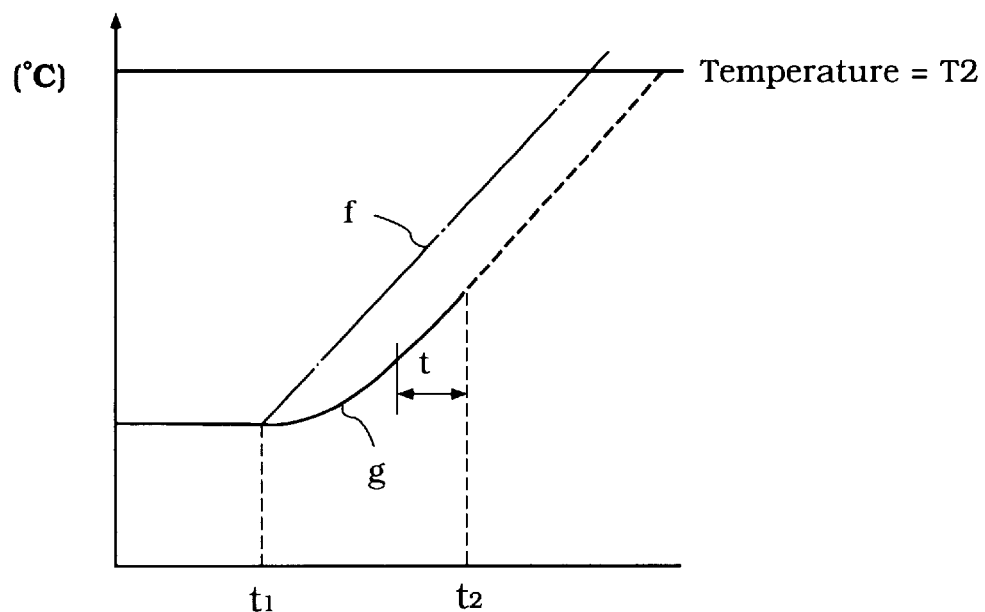
FIG. 4 is a graphical view showing the relation between actual engine temperature and sensor output during an overheating condition.

In addition to merely sensing the actual temperature, the system also operates so as to measure engine temperature change so as to anticipate a dangerous condition. This may be understood by reference to FIG. 4 which depicts a situation wherein it may be seen how the output of the temperature sensor may be inadequate to provide safety warning for preventing the dangerous condition from occurring.

In this figure, the solid-line curve to the left of the point t1 indicates the actual temperature of the engine when operating under a normal condition. If, however, an abnormality occurs, the actual engine temperature may rise in accordance with the curve f (dot-dash) and reach a dangerous level. However, because of its location and inherent inertia, the temperature sensor output indicated by the curve g lags behind the actual engine temperature increase. As a result and seen by the broken-line curve, the dangerous temperature will not be indicated until after the actual engine temperature has reached the dangerous level.

Therefore, in accordance with a feature of the invention, the sensor operates so as to provide an indication if the temperature exceeds a predetermined temperature, such as the threshold temperature, for more than a time period t. As may be seen, this signal will then be indicated at the time t2, which is still early enough to protect the engine and before even the actual engine temperature has reached the dangerous level.

Figure 5:
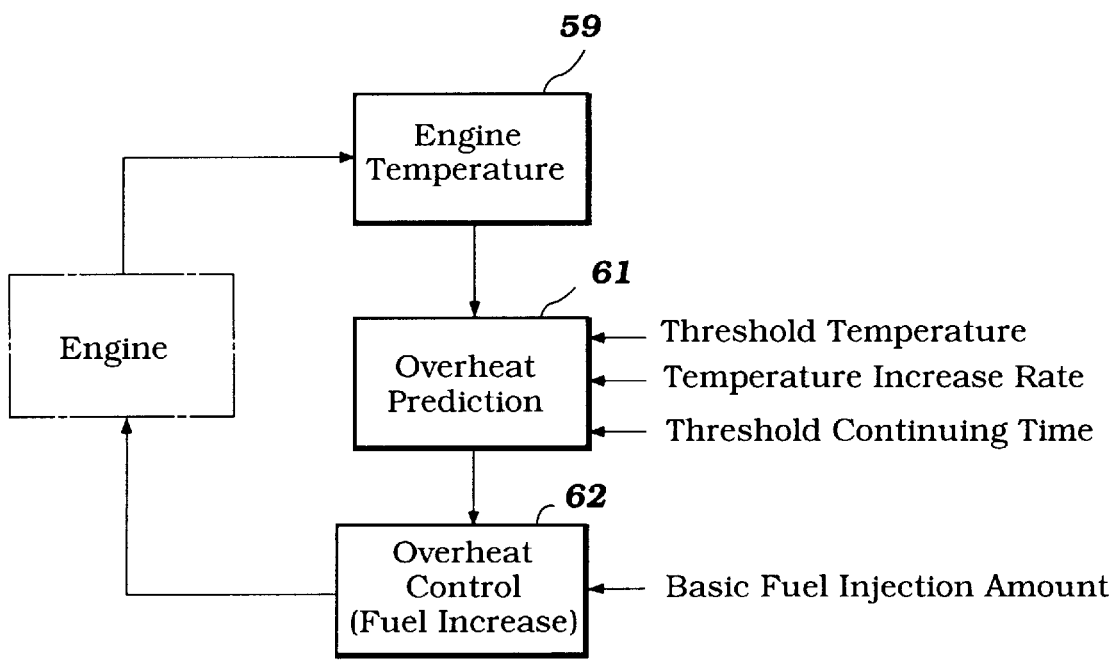
FIG. 5 is a block diagram showing the various components of the system utilized in these controls and their interrelationship.

Thus, the system operates as shown in FIG. 5, wherein the engine is associated with the temperature detector, and the temperature detector 59 outputs its signal to an overheat prediction circuit, indicated by the reference numeral 61, which receives inputs based upon the threshold temperature, the increase in temperature above the threshold temperature and the rate of increase, and the time involved. The overheat state may be predicted when the rate of increase in engine temperature is more than a predetermined amount and occurs for more than a predetermined time. Thus, the control section 61 outputs a signal to a control section 62 that receives the basic fuel injection amount signal and modifies it in accordance with the control routine of FIG. 3 when necessary.

Thus, from the foregoing description it should be readily apparent that the described construction is very effective in ensuring against engine damage due to engine overheat by predicting when a dangerous situation may occur and then attempting to protect against the occurrence of that situation. Of course, the foregoing description is that of preferred embodiments of the invention, and various changes and modifications may be made without departing from the spirit and scope of the invention, as defined by the appended claims.

What is claimed is:

1. An engine operational control system comprised of an internal combustion engine having a cooling system, an engine temperature detector associated with said engine cooling system for measuring the temperature of said engine, overheat predicting means receiving the output of the signal from said engine temperature detector and determining from the measured engine temperature and independently of other engine parameters when a dangerous overheating condition may be imminent, even though the temperture detected is substantially less than a dangerous temperature, and overheat preventing means for providing preventive action in response to a signal from said overheat predicting means for attempting to reduce the temperature of said engine.

2. An engine operational control system as defined in claim 1, wherein the overheat preventing means includes means for increasing the amount of fuel supplied to the engine.

3. An engine operational control system as defined in claim 1, wherein the overheat predicting means predicts an overheat state when the rate of increase in engine temperature is more than a predetermined amount and still below the dangerous level and persists for more than a predetermined time period.

4. An engine operational control system as defined in claim 1, wherein the overheat prediction means detects when the engine temperature is above a normal temperature and below a dangerous engine temperature and outputs a signal when that above normal but below dangerous level temperature is reached.

5. An engine operational control method for an internal combustion engine having a cooling system, said method comprising the steps of measuring the temperature of said engine, determining when a dangerous overheating condition may be imminent from the measured temperature and independently of other engine paramaters even though the actual temperature is substantially below the dangerous level, and providing preventive action for attempting to reduce the temperature of said engine in response to the determination of the imminence of a dangerous overheating condition.

6. An engine operational control method as defined in claim 5, wherein the overheat prevention is initiated by increasing the amount of fuel supplied to the engine.

7. An engine operational control method as defined in claim 5, wherein the overheat state is predicted when the rate of increase in engine temperature is more than a predetermined amount and continues for more than a predetermined time period.

8. An engine operational control method as defined in claim 5, wherein the overheat is predicted when the engine temperature is above a normal temperature and below a dangerous engine temperature.

* * * * *